(12) United States Patent
Shijo et al.

(10) Patent No.: US 6,247,239 B1
(45) Date of Patent: Jun. 19, 2001

(54) CLINOMETRIC SENSOR

(75) Inventors: Yoshihisa Shijo; Hiroshi Sone, both of Tokyo (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/079,380

(22) Filed: May 15, 1998

(30) Foreign Application Priority Data

May 16, 1997 (JP) .................................................. 9-127137

(51) Int. Cl.[7] ......................................................... G01C 9/06
(52) U.S. Cl. ......................................... 33/366.11; 33/366.15
(58) Field of Search ................................... 33/366, 366.11, 33/366.15, 366.18, 366.19, 366.21, 366.22, 366.25, 366.26; 356/141

(56) References Cited

U.S. PATENT DOCUMENTS

| | | | |
|---|---|---|---|
| 3,817,625 | * | 6/1974 | Jordan ................................. 356/141 |
| 4,063,366 | * | 12/1977 | Bane ...................................... 33/366 |
| 4,937,518 | * | 6/1990 | Donati et al. ........................ 33/366 |
| 5,042,158 | * | 8/1991 | Schmelzer ........................... 33/366 |
| 5,351,539 | * | 10/1994 | Ziegenbein et al. ................ 33/366 |
| 5,452,520 | * | 9/1995 | Raj et al. .............................. 33/366 |
| 5,574,442 | * | 11/1996 | Kinoshita et al. ................... 33/366 |
| 5,625,955 | * | 5/1997 | Han ....................................... 33/366 |
| 5,630,280 | * | 5/1997 | Crossan, Jr. ......................... 33/366 |
| 5,802,728 | * | 9/1998 | Karnick et al. ...................... 33/366 |
| 5,930,907 | * | 8/1999 | Ogawa et al. ................... 33/366.11 |
| 5,953,116 | * | 9/1999 | Ohtomo et al. ...................... 33/366 |
| 5,955,713 | * | 9/1999 | Titus et al. ........................... 33/366 |
| 6,123,866 | * | 9/2000 | Shijo .............................. 33/366.21 |

* cited by examiner

*Primary Examiner*—Diego Gutierrez
*Assistant Examiner*—Yaritza Guadalupe
(74) *Attorney, Agent, or Firm*—Greenblum & Bernstein, P.L.C.

(57) ABSTRACT

The closed container for an clinometric sensor is assembled of a tube-like member with a circular cross section, and a pair of side boards shaped like a disc and closing both opening ends of the tube-like member. On the inside flat plane of one side board, a pair of first electrodes are formed with a gap passing the central axis of the tube-like member and trending in the radial direction of the tube-like member. On the other hand, on the inside flat plane of the other side board, a second electrode is formed through the approximately whole area thereof. In the closed container, an electrolytic solution of approximately a half of the volume thereof is injected.

11 Claims, 6 Drawing Sheets

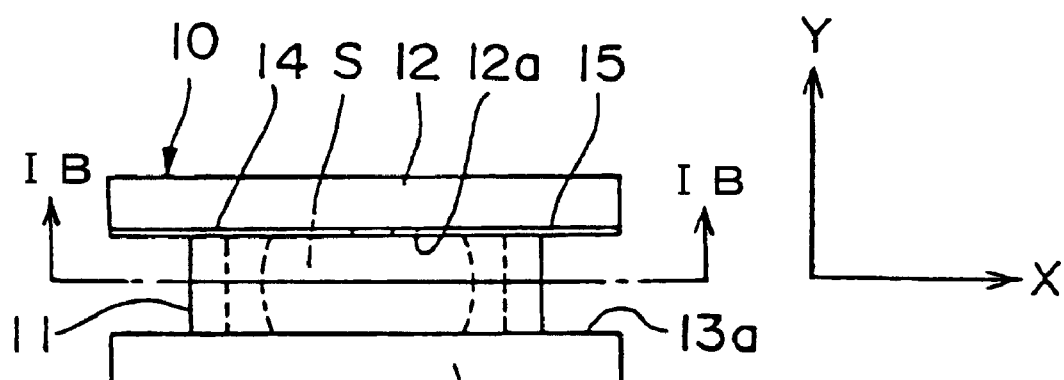
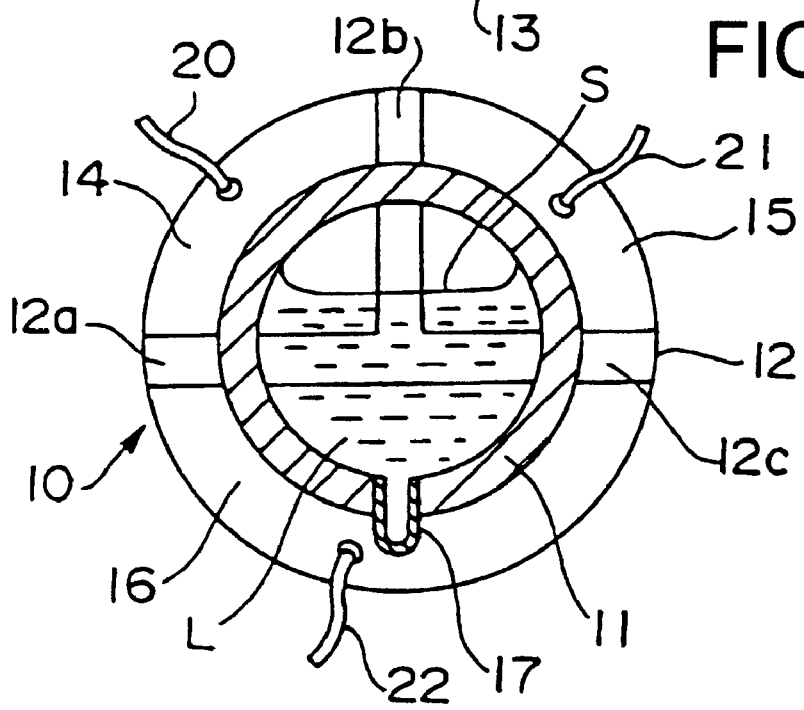

CLINOMETRIC SENSOR

BACKGROUND OF THE INVENTION

1. Field of the Invention

The present invention relates to a clinometric sensor, and more particularly relates to a clinometric sensor for finding an inclinational angle relative to the horizon. The present disclosure relates to subject matter contained in Japanese Patent Application No. 9-127137 (filed on May 16, 1997), which is expressly incorporated herein by reference in its entirety.

2. Description of the Related Art

Previously, as a clinometric sensor detecting an inclinational angle relative to the horizon, various types of sensors which output an electric signal corresponding to the position of a bubble in the liquid sealed in a closed container have been proposed. For example, in Japan Patent Laid-Open Publication No. Hei 7-146142, a clinometric sensor with a closed container assembled of a plurality of parts is proposed. The structure of this closed container is shown in FIG. 6.

In FIG. 6, a top board 60 has a disk shape wherein only a surface on one side thereof is shaped to be a spherical concave surface. On this spherical concave surface, upper electrodes 63, 63 with symmetrical shapes about the central axis of the top board 60 are formed. Furthermore, a bottom board 62 is made of a parallel flat glass shaped like a disc. On the whole area of the upper surface of the bottom board 62, a lower electrode 64 is formed. By affixing the top board 60 and the bottom board 62 to each end surface of a cylinder member 61, the closed container is completed. Then, in the closed container, the electrolytic solution L is injected and sealed, the remaining air forming a bubble B.

By using such a closed container, when voltage is applied between each of the upper electrodes 63, 63 and the lower electrode 64, the contact area of the electrolytic solution L to each of the upper electrodes 63, 63 is changed according to the position of the bubble B, so that the value of resistance between each of the upper electrodes 63, 63 and the lower electrode 64 may be changed. Consequently, the ratio of both currents flowing through the respective upper electrodes 63, 63 is changed. The ratio of currents is detected by a detection circuit (not shown in the figure) as a signal showing the inclinational angle relative to the horizon of the closed container.

The closed container thus arranged must be attached to the object of detection under the condition that the attachment accuracy in the detection direction (in which the inclinational angle is to be detected) is precise so that the inclination of the object of detection to which the closed container is attached may accurately correspond to the detection result. In other words, the relative attachment angle of the closed container and the object of detection in the detection direction (in which the inclinational angle is to be detected) must be adjusted so that the ratio of currents may be the value showing the horizontal state when any of the surfaces of the object of detection trends in the horizontal direction (or, when any axis of the object of detection trends in the vertical direction). On the other hand, the attachment accuracy in a direction rectangular to the detection direction (that is, the relative attachment angle of the closed container and the object of detection) does not directly affect the corresponding relation of the inclination of the object of detection and the detection result.

However, in the previous closed container with the above mentioned arrangement, the under surface of the top board 60 is formed as a spherical surface having a constant curvature in all directions and through the whole area. Therefore, when the closed container is inclined in the direction perpendicular to the detection direction, even if the inclination of the closed container in the detection direction is within the range in which the angle can be detected, there is a case where the bubble B may contact the wall surface of the cylinder member 61. Furthermore, if the angle of inclination of the closed container in the direction perpendicular to the detection direction exceeds the maximum angle capable of being detected by the clinometric sensor, the bubble B contacts the inner wall surface of the cylinder member 61 at all times. Since the tension for the bubble B to contact with the inner surface of the cylinder member 61 is larger than the buoyancy of the bubble B, the movement of the bubble B becomes unsmooth in case the bubble B has contacted the inner wall surface of the cylinder member 61. Therefore, if the bubble B has contacted the inner wall surface of the cylinder member 61, the angle of inclination of the object of detection cannot accurately be detected. In order to prevent such a problem, another clinometric sensor must be attached also in the direction perpendicular to the detection direction, with an accuracy approximately equal to that in the detection direction.

Furthermore, because of the above mentioned reasons, the closed container with the above mentioned arrangement can detect the inclinational angle of object of detection only in the range where the bubble B moves while contacting only the spherical concave surface of the top board 60. Accordingly, in the known closed container, in order to increase the range of the inclinational angle where the bubble B can properly move, a sufficiently large amount of electrolytic solution compared with the volume of the bubble B is injected and sealed in the closed container so as to make the diameter of the bubble B sufficiently smaller than the diameter of the spherical concave surface. Accordingly, even an insufficient change of the volume of the electrolytic solution L largely affects the volume of the bubble B. Therefore, depending on the temperature under the operating conditions of the clinometric sensor, there may be a case where the bubble B is expanded or shrunk to change the diameter thereof according to the change of the volume of the electrolytic solution L. In such a case, the proportion of the inclinational angle of the closed container to the contact ratio of the electrolytic solution L and each of the upper electrodes 63, 63 will fluctuate. Furthermore, if the volume of the bubble B becomes too small, the buoyancy of the bubble B becomes lower than the tension of the bubble B to contact with the spherical concave surface, so that the bubble B may not smoothly move according to the inclination of the closed container. Because of such a reason, when using the known closed container, there has been a case where the inclinational angle of the object of detection cannot accurately be measured.

SUMMARY OF THE INVENTION

The present invention has been proposed in view of the above mentioned problems, and an object of the present invention is to provide an clinometric sensor which can relieve the requirement of high attachment accuracy of the closed container to the object of detection in the direction perpendicular to its detection direction (in which the inclinational angle is to be detected), and which can relieve the effects of the fluctuation of the volume of air depending on the change of the temperature.

The present invention adopts the following arrangement in order to solve the above mentioned subjects. That is, the clinometric sensor according to a first aspect of the present invention comprises a closed container having a tube-like member and a pair of side members, each having a flat surface for closing an end opening of the tube-like member, and an electrolytic solution injected in the closed container and forming a substantially flat surface when a central axis of the tube-like member trends in the horizontal direction. Thus arranged, the clinometric sensor is fixed to the object of detection, in a state where the central axis of the tube-like member of the closed container trends in the horizontal direction and the direction perpendicular to the central axis trends in a detection direction (in which the detection of the inclinational angle of the object is executed), in order to detect the inclinational angle of the object. At this time, the electrolytic solution forms the substantially flat surface parallel to the central axis of the tube-like member in the closed container. Then, in a case where the closed container is inclined from the initial state in the detection direction, the electrolytic solution is relatively and smoothly inclined in the closed container while the substantially flat surface is maintained, because the buoyancy of the air in the closed container becomes considerably larger than the surface tension between the liquid surface and the inner surface of the closed container. Here, the shape of the cross section of the tube-like member may, for example, be like a circle, and may be like a polygon. Furthermore, the whole shape and the shape of the outer fringe of each side member may be freely selected by the designer, as long as it has a flat surface for fluid-sealing the opening of the tube-like member.

According to a second aspect of the present invention, the tube-like member is formed such that the length thereof in a direction of the central axis is shorter than the size of the diameter thereof. When arranged in this manner, even if the quantity of the electrolytic solution is comparatively small compared with the volume of the closed container, the substantially flat surface is formed in the closed container.

According to a third aspect of the present invention, the tube-like member is assembled of a plurality of board-like members, and the inner surface of the tube-like member is formed as a concave surface having a curvature in a direction perpendicular to the central axis of the tube-like member. When arranged in this manner, the tube-like member can easily be constructed when compared with a tube-like member with a circular cross section or an oval cross section.

BRIEF DESCRIPTION OF THE DRAWINGS

The invention will be described below in detail with reference to the accompanying drawings, in which:

FIGS. 1A and 1B are structural figures of a closed container of an clinometric sensor according to a first embodiment of the present invention;

DESCRIPTION OF THE PREFERRED EMBODIMENT

Figure 2A:
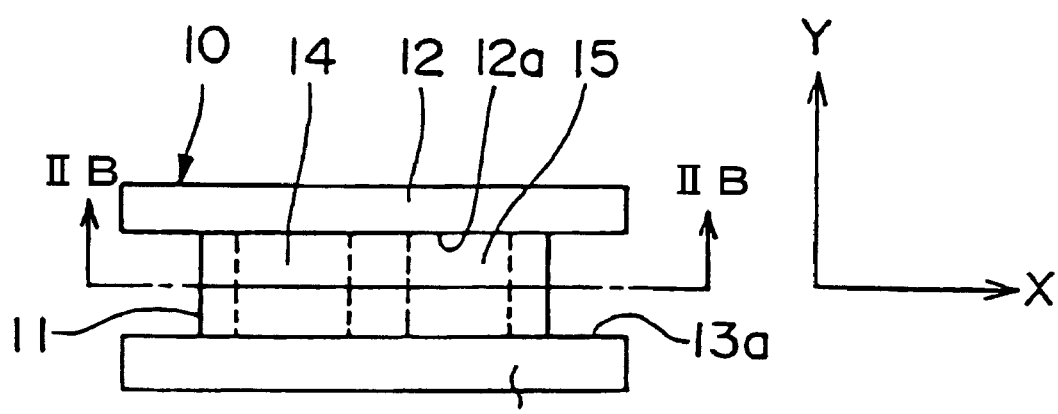
FIGS. 2A and 2B are structural figures showing a deformation embodiment of the closed container shown in FIGS. 1A and 1B.

The preferred embodiment of the present invention will be described below on the basis of the drawings.

FIRST EMBODIMENT

Arrangement of the Clinometric Sensor

FIG. 1A is a top view of a closed container 10 of the clinometric sensor according to the first embodiment, and FIG. 1B is a vertical cross-sectional view showing a section of the closed container 10 along the line $I_B$—$I_B$ in FIG. 1C. As shown in FIG. 1A, the closed container 10 of the clinometric sensor is assembled of a cylinder member 11, with a first side board 12 and a second side board 13 closing both end openings of the cylinder member 11.

The cylinder member 11 is a transparent tube or closed tubular shape (necessarily closed or fluid would escape), both end surfaces of which are formed parallel to each other, and, as clearly shown in FIG. 1A, to be arranged along an (imaginary) flat plane perpendicular to an axis about which the sensor must tilt (tilting axis) with both end openings open toward either side of the (imaginary) flat plane. An injecting tube 17 with a small diameter is formed in a manner penetrating the peripheral wall of the cylinder member 11 and projecting from the peripheral surface of the cylinder member 11. The first side member or board 12 is a transparent board made of a circular parallel-faced flat plate whose outside diameter is larger than the outside diameter of the cylinder member 11. The second side member or board 13 is a transparent board with the same size and the same shape as the first side board 12.

The cylinder member 11, the first side board 12, and the second side board 13 are all made of lead glass, and are (fluid-sealed) adhered to one another, by adhesives such as a glass paste, in a state where the axes thereof are coincident (i.e., the "axes" being normal to the flat surfaces of the side members or boards 12, 13 and normal to the imaginary flate plane of the tube-like cylinder member 11). The end openings of the substantially tubular shape are thereby closed. The direction (the direction X in FIG. 1A) perpendicular to the direction of the central axis (tilting axis) of the closed container 10 is the horizontal reference direction or detection direction (in which the inclinational angle of the object of detection is to be detected, i.e., the deviation or tilt of the detection direction about the tilting axis and away from the terrestrial horizon direction of the object of detection is detected), and the direction of the central axis of the closed container 10 (direction Y in FIG. 1A) is perpendicular to the detection direction. The length or thickness of the sensor in the direction of the central or tilting axis is shorter than the diameter of the sensor.

The flat surface (or flat plane) 12a (inner wall surface contacting the cylinder member 11) of the first side board 12 in the closed container 10, is finished to be a surface with a specified roughness by being ground using, for example, an abrasive of # 1000. As shown in FIG. 1B, at the position above the center on the flat surface 12a, a pair of first electrodes 14, 15 with symmetric shapes are formed. Furthermore, at the position below the center on the flat surface 12a, a second electrode 16 (common electrode) is formed. The respective first electrodes 14, 15 and the second electrode 16 are formed by applying a T-shaped masking on the flat surface 12a and by depositing a thin film of platinum with a high frequency spatter.

The first electrodes 14, 15 are shaped like a fan, respectively, separated from each other by a straight gap 12b extending in a vertical reference direction perpendicular to the horizontal reference direction and with a constant width, and therefore positioned symmetrically about the bisector passing through the center of the flat surface 12a. The gap 12b, as are all similar gaps between electrodes described herein, is non-conductive (necessarily so, since the gaps electrically separate the electrodes). The circular arc of each of the first electrodes 14, 15 is overlapped onto the outer fringe of the flat surface 12a, and consequently, the outer fringe of each of the first electrodes 14, 15 is exposed to the outside of the cylinder member 11.

Furthermore, the second electrode 16 is shaped like a semicircle, and is separated from both of the first electrodes 14, 15 by a straight gap 12c with a constant width perpendicular to the above mentioned gap 12b. The circular arc of the second electrode 16 is overlapped onto the outer fringe of the flat surface 12a, and consequently, the outer fringe of the second electrode 16 is exposed to the outside of the cylinder member 11.

In the closed container 10 thus constructed, an appropriate amount of electrolytic solution L is injected through the injecting tube 17, and the electrolytic solution L is sealed by closing the tip of the injecting tube 17. Consequently, approximately ⅗ of the whole volume of the interior of the closed container 10 is filled with the electrolytic solution L, and the rest is made to be a space filled with air.

As the electrolytic solution L, a liquid made by dissolving potassium iodide into methanol is used.

The electrolytic solution L forms a substantially flat surface S in the closed container 10 when the closed container 10 is positioned in such a state that the central axis (tilting axis) of the cylinder member 11 trends in the horizontal direction (i.e., direction of the terrestrial horizon). This surface S contacts the inner peripheral surface of the cylinder member 11, the flat plane 12a, and the flat plane 13a in a case where the inclinational angle in the direction Y of the closed container 10 is within the range of a specified angle.

Furthermore, in a case where the closed container 10 is positioned in such a state that the central axis of the cylinder member 11 trends in the horizontal direction and the gap 12b between both first electrodes 14, 15 exists in any vertical plane, the electrolytic solution L contacts either or both of the first electrodes 14, 15, and always contacts the second electrode 16 (i.e., contacts the second electrode 16 at all times and in all inclination angles of the sensor).

Lead wires 20, 21, and 22 are respectively connected to the respective positions exposed to the outside of the cylinder member 11 of the first electrodes 14, 15 and the second electrode 16. These respective lead wires 20, 21, and 22 are connected to the voltage source (not shown in the figure) and the signal detection circuit (not shown in the figure), respectively.

Function of the Clinometric Sensor

The above mentioned closed container 10 is contained in a housing (not shown in the figure) of the clinometric sensor. For detecting the angle of inclination of the object of detection, the closed container 10 contained in the housing (not shown in the figure) is attached to the object of detection in the normal position, in a state where the direction perpendicular to the central axis of the cylinder member 11 in the closed container 10, i.e., the horizontal reference direction, trends in the detection direction (in which the inclinational angle of the object of detection is to be detected).

The electrolytic solution L in the closed container 10 forms a surface S along the horizontal plane parallel to the central (tilting) axis of the cylinder member 11 when the central (tilting) axis of the cylinder member 11 in the closed container 10 trends in the horizontal direction and the center line of the above mentioned gap 12b or vertical reference direction exists in any vertical plane. However, even in a state where the central axis of the cylinder member 11 is inclined relative to the horizontal plane, this surface S contacts the inner peripheral surface of the cylinder member 11, the flat surface 12a, and the flat surface 13a, respectively, as long as the inclinational angle is within a specified range. Furthermore, in a case where the inclinational angle of the central axis of the cylinder member 11 relative to the horizontal plane is within a specified range, the electrolytic solution L contacts each of the first electrodes 14, 15 with approximately the same contact area, as long as the center line of the above mentioned space 12b exists in any vertical plane.

When the closed container 10 is inclined in the detection direction in which the inclinational angle is to be detected, i.e., away from the terrestrial horizon, the electrolytic solution L in the closed container 10 relatively moves along the inner peripheral surface of the cylinder member 11 in a state where the substantially flat surface S is kept horizontal. At the same time, the air in the closed container 10 also moves. At this time, the air in the closed container 10 smoothly moves, because the air moves without pushing away the electrolytic solution L, differently from the case where the bubble moves in the liquid.

By the movement of the electrolytic solution L, the contact areas of the electrolytic solution L to the respective first electrodes 14, 15 are changed, proportional to the inclinational angle. Consequently, the values of electrical resistance between the respective first electrodes 14, 15 and the second electrode 16 are changed. Therefore, when the same voltage is applied between the respective lead wires 20, 21 and the lead wire 22 by a constant voltage source (not shown in the figure), the currents flow through the respective first electrodes 14, 15 according to the values of resistance between the respective first electrodes 14, 15 and the second electrode 16, that is, according to the inclinational angle of the object of detection. Consequently, the ratio of the currents between the respective first electrodes 14, 15 and the second electrode 16, is detected as a signal showing the inclinational angle of the object of detection by the detection circuit (not shown in the figure).

Advantageous Effect of the Example

According to the first embodiment, the electrolytic solution L in the closed container 10 forms a substantially flat surface S respectively contacting the cylinder member 11, the flat surface 12a of the first side board 11, and the flat surface 13a of the second side board 13, in a case where the inclinational angle of the central axis of the closed container 10 relative to the horizontal plane is within a specified range. Then, in a case where the closed container 10 is inclined in the detection direction in which the inclinational angle is to be detected, the electrolytic solution L moves in the closed container LD while keeping the substantially flat surface S. At this time, the air in the closed container 10 smoothly moves, since the buoyancy thereof is considerably larger than the tension thereof to contact with each surface and the air moves without pushing away the electrolytic solution L in the closed container 10. Thus, by the clinometric sensor according to the first embodiment, the inclinational angle of the object of detection can properly be detected, even in a case where the closed container 10 (clinometric sensor) is badly adjusted and fixed in the direction perpendicular to its detection direction.

Furthermore, in the clinometric sensor according to the first embodiment, the height of the surface S of the electrolytic solution L is not excessively changed, even if the volume of the electrolytic solution L is changed by the temperature under the operating conditions of the clinometric sensor. Therefore, the electrolytic solution L contacts each of the first electrodes 14, 15 with the same contact area, as long as the center line of the space 12b or vertical reference direction exists in any vertical plane. Accordingly, the fluctuation of the detection result due to the temperature can be avoided.

Furthermore, in the clinometric sensor according to the first embodiment, an amount of electrolytic solution L that forms an substantially flat surface S which contacts the inner peripheral surface of the cylinder member 11, the flat surface 12a of the first side board 12, and the flat surface 13a of the second side board 13 respectively is a sufficient amount when injected and sealed. Therefore, the amount of the electrolytic solution L relative to the whole volume of the closed container 10 can be decreased, compared with that in the prior art. Moreover, the sensor is arranged such that the above mentioned surface S can be formed by only a small amount of electrolytic solution L, so that the length in the direction of the central axis of the cylinder member 11 is made to be shorter than the diameter thereof. Consequently, the closed container 10 can be miniaturized, compared with that in the prior art.

Furthermore, since each of the first electrodes 14, 15 and the second electrode 16 are formed on the flat surface 12a of the first side board 12, the electrodes can be formed more easily, compared with those in prior art. Furthermore, a part of each of the first electrodes 14, 15 and the second electrode 16 is exposed to the outside, so that the lead wires 20, 21 and the lead wire 22 can easily be connected.

Figure 2B:
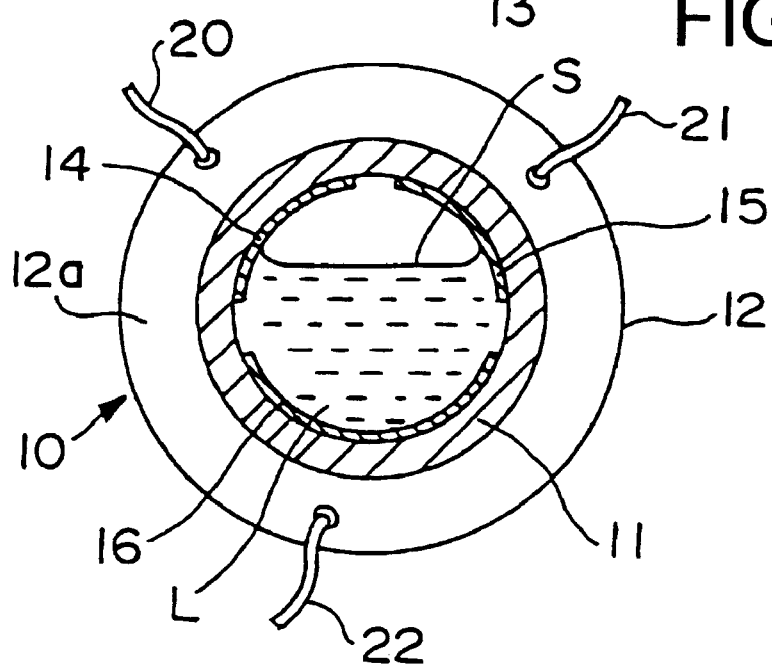

Moreover, in the first embodiment, each of the first electrodes 14, 15 and the second electrode 16 are formed on the flat surface 12a of the first side board 12, but, for example, as shown in FIG. 2A and FIG. 2B (a section along line II$_B$—II$_B$ of FIG. 2A), the electrodes 14, 15, and 16 can be formed on the inner peripheral surface (inner circumference) of the cylinder member 11. Furthermore, it is also possible that one group of the first electrodes 14, 15 and the second electrode 16 are formed on the inner peripheral surface of the cylinder member 11 and the other group is formed on the flat surface 12a.

SECOND EMBODIMENT

Figure 3A:
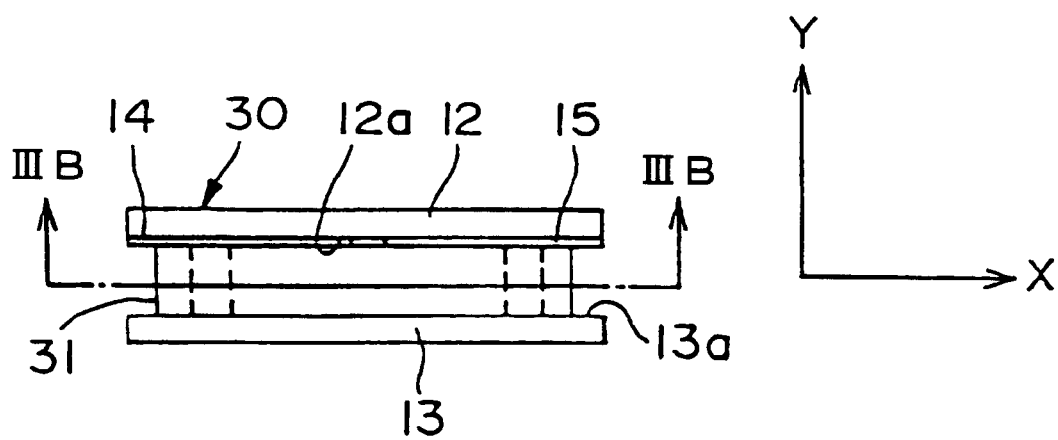
FIGS. 3A and 3B are structural figures of a closed container of an clinometric sensor according to a second embodiment of the present invention.

Next, the clinometric sensor according to the second embodiment will be described. FIG. 3A is a top view of a closed container 30 of the clinometric sensor according to the second embodiment, and FIG. 3B is a vertical cross-sectional view showing a section of the closed container 30 along the line III$_B$—III$_B$ in the FIG. 3A.

Figure 3B:
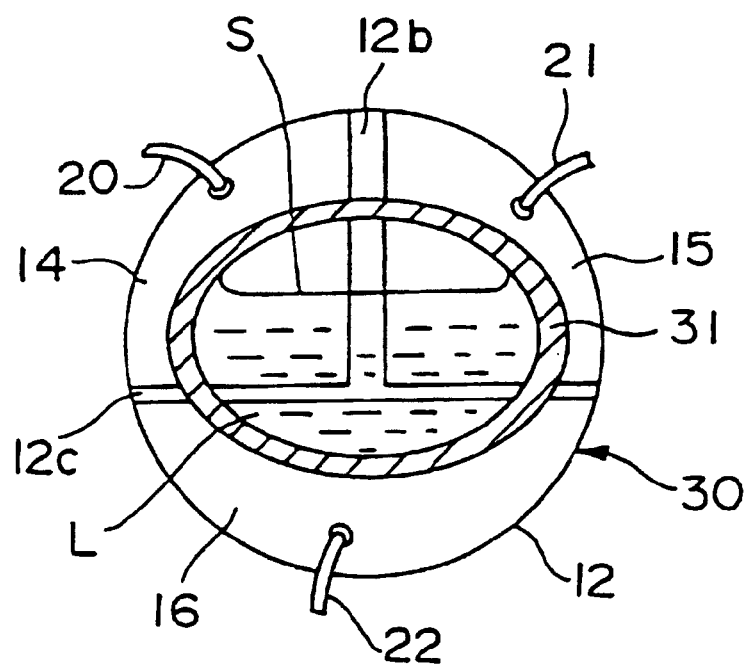

As shown in FIG. 3A and FIG. 3B, the closed container 30 of the clinometric sensor according to the second embodiment is assembled of a oval cylinder member 31 with an oval cross section, while the first and second side boards 12, 13 are the same as those of the first embodiment. This oval cylinder member 31 is adhered to the first side board 12 so that the minor axis in the cross section thereof may be parallel to the gap 12b between the first electrodes 14, 15, i.e., both the minor axis of the cylinder shape and the gap 12b extend in the vertical reference direction, and the major axis in the cross section thereof may be parallel to the gap 12c between the first electrodes 14, 15 and the second electrode 16, i.g., both the major axis of the cylinder and the gap 12c extend in the horizontal reference direction. Then, this closed container 30 is positioned such that the direction of the major axis in the cross section of the cylinder member 31 trends in the detection direction (direction X in FIG. 3A) in which the inclinational angle is to be detected. Except for the above mentioned points, the closed container 30 in the second embodiment has the same arrangement as the closed container 10 in the first embodiment, and the function thereof is also approximately the same.

The advantageous effect of the second embodiment is approximately similar to the advantageous effect of the first embodiment. Furthermore, similarly to the first embodiment, it is also possible that at least one group of the respective first electrodes 14, 15 and the second electrode 16 is formed on the inner peripheral surface of the cylinder member 31 instead of being formed on the flat surface 12a.

THIRD EMBODIMENT

Figure 4A:
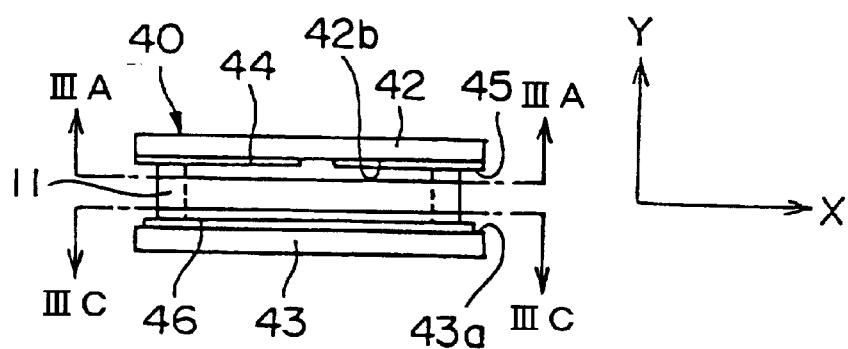
FIGS. 4A, 4B, and 4C are structural figures of a closed container of an clinometric sensor according to a third embodiment of the present invention.
Figure 4B:
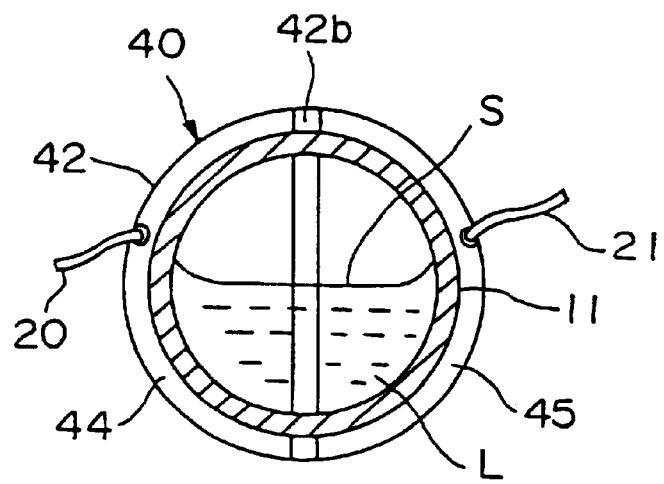
Figure 4C:
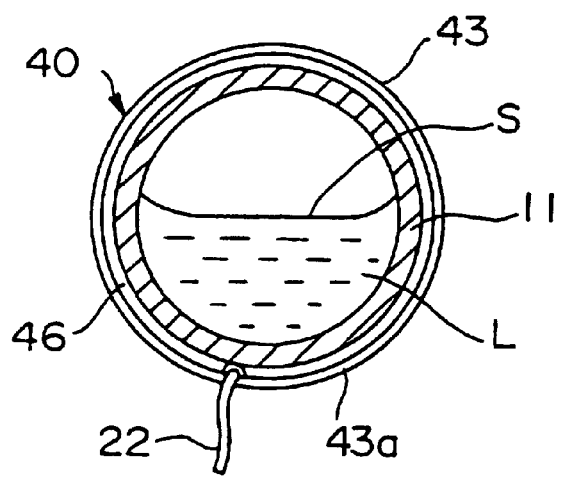

Next, the clinometric sensor according to the third embodiment will be described. FIG. 4A is a top view of a closed container 40 of the clinometric sensor according to the third embodiment, FIG. 4B is a vertical cross-sectional view showing a section of the closed container 40 along the line IV$_B$—IV$_B$ in the FIG. 4A, and FIG. 4C is a vertical cross-sectional view showing a section of the closed container 40 along the line IV$_C$—IV$_C$ in FIG. 4A. Furthermore, as to the structural components similar to those of the closed container 10 in the first embodiment, the same numeral indicators are given, and the description thereof will be omitted.

As shown in FIG. 4B, in the closed container 40 in the third embodiment, semi-circular first electrodes 44, 45 are formed on the flat surface 42a (inner wall surface contacting the cylinder member 11) of the first side board 42 with the same shape as the first side board 12 of the first embodiment, in a way similar to that of the first electrodes 14, 15 of the first embodiment. The first electrode 44 and the first electrode 45 are formed to be separated from each other by a straight gap 42b with a constant width and are therefore positioned symmetrically about the bisector passing the center of the first side board 42. The outer fringe of each of the first electrodes 44, 45 is overlapped onto the outer fringe of the first side board 42.

On the other hand, as shown in FIG. 4C, a second electrode 46 is formed onto the flat surface 43a (inner wall surface contacting the cylinder member 11) of the second side board 43 with the same shape as the second side board 13 of the first embodiment. The second electrode 46 is shaped like a circle of which diameter is slightly smaller than the diameter of the flat surface 43a and larger than the outside diameter of the cylinder member 11, and is formed to be coaxial with the outer fringe of the flat surface 43a. Consequently, the outer fringe of the second electrode 46 is exposed to the outside of the cylinder member 11. Furthermore, it is also possible that the second electrode 46 is formed through the whole surface of the flat surface 43.

In the closed container 40 thus constructed, an amount of electrolytic solution L capable of filling approximately ½ of the inner space of the closed container 40 is injected and sealed, and consequently, the electrolytic solution L forms a substantially flat surface S respectively contacting the inner peripheral surface of the cylinder member 11, the flat surface 42a, and the flat surface 43a.

Then, the closed container 40 is fixed to the object of detection in a state where the direction (direction X in FIG. 4A) perpendicular to the central axis of the cylinder member 11 or horizontal reference direction trends in the detection direction (in which the inclinational angle of the object of detection is to be detected). At this time, the center line of the above mentioned gap 12b or vertical reference direction exists in any vertical plane. Except for the above mentioned points, the closed container 40 in the third embodiment has the same arrangement as the closed container 10 in the first embodiment, and the function thereof is also approximately the same.

The advantageous effect of the third embodiment is approximately similar to the advantageous effect of the first embodiment. However, since the first electrodes 44, 45 are formed on the flat surface 42a and the second electrode 46 is formed on the flat surface 43a, the amount of the injected electrolytic solution L relative to the whole volume of the closed container can be decreased, compared with that of the first embodiment.

FOURTH EMBODIMENT

Figure 5A:
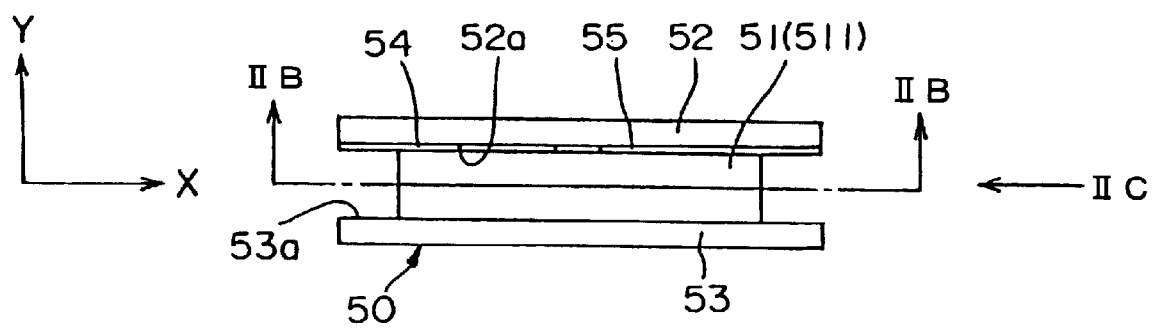
FIGS. 5A, 5B, and 5C are structural figures of a closed container of an clinometric sensor according to a fourth embodiment of the present invention.
Figure 5B:
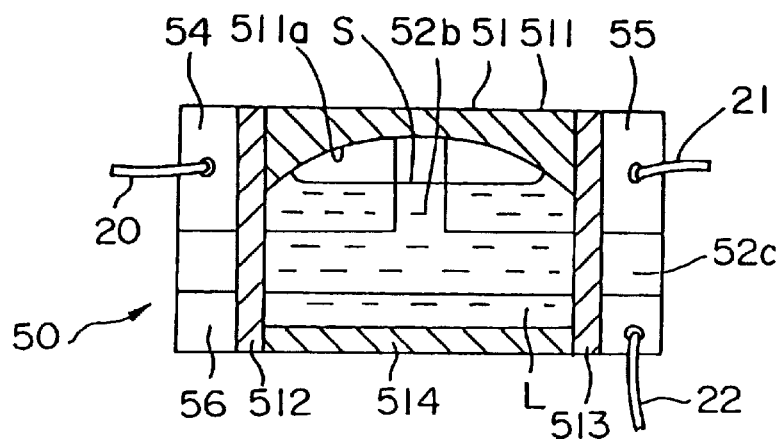
Figure 5C:
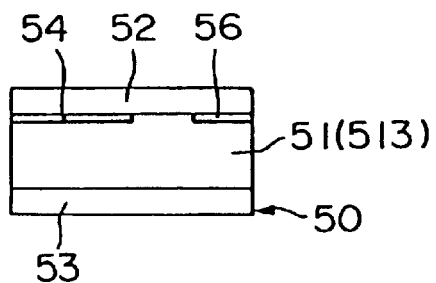
Figure 6:
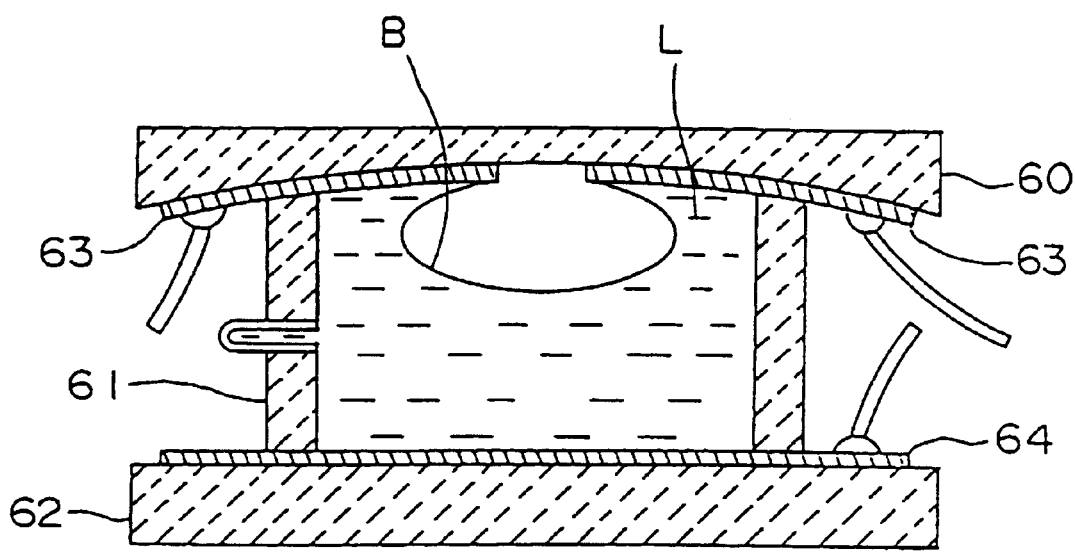
FIG. 6 is a longitudinal sectional view of an example according to the prior art.

Next, the clinometric sensor according to the fourth embodiment will be described. FIG. 5A is a top view of a closed container 50 of the clinometric sensor according to the fourth embodiment, FIG. 5B is a vertical cross-sectional view showing a section of the closed container 50 along the line $V_B$—$V_B$ in the FIG. 5A, and FIG. 5C is a side view of the closed container 50 seen from the direction $V_C$ in FIG. 5A.

As shown in FIG. 5A, the closed container 50 of the clinometric sensor is assembled of a closed substantially rectangular shape (FIG. 5B) or square tube member 51 and a first side board 52 and a second side board 53 closing both opening ends of the square tube member 51. The direction (direction X in FIG. 5A) perpendicular to the central (tilting) axis of the square tube member 51 is the horizontal reference direction relative to the detection direction (in which the inclinational angle of the closed container 50 is to be detected), and the direction (direction Y in FIG. 5A) of the central (tilting) axis of the square tube member 51 is perpendicular to the detection direction.

The square tube member 51 is a transparent tube in which both opening end surfaces are formed parallel to each other. The square tube member 51 is assembled of a top board 511, a bottom board 514, and a pair of side boards 512, 513. The inside surface (surface composing the inner surface of the square tube member 51) of the top board 511 is a concave surface 511a which is curved like an arch with a curvature only in the direction perpendicular to the central axis of the square tube member 51, i.e., a center of the curvature of the arch is arranged such that a tangent to the center of the curvature is parallel to the horizontal reference direction, i.e., as clearly shown in FIG. 5B, the center of curvature is the peak of the curvature when the horizontal reference direction trends in the direction of the terrestrial horizon. The bottom board 514 is positioned parallel to the top board 511. The pair side boards 512, 513 are installed between the respective corresponding side surfaces of the top board 511 and the bottom board 514. Each of the boards 511, 512, 513, 514 composing the square tube member 51 is respectively made of a lead glass board, and they are affixed to one another by adhesives such as a glass paste. The cross-sectional shape of the outer face of the square tube member 51 is a shape of a rectangle having an outer size in the horizontal direction (direction of the flat plane of the bottom board 514) longer than the outer size in the vertical direction (direction of the flat plane of each of the side boards 512, 513).

Furthermore, the first side board 52 is a transparent board with a rectangular parallel flat plane, in which the length of the shorter side is equal to the outer size in the vertical direction of the square tube member 51, and the length in the longer side is longer than the outer size in the horizontal direction of the square tube member 51. Furthermore, the second side board 53 is a transparent board with the same size and the same shape as the first side board 52. Then, the square tube member 51, the first side board 52, and the second side board 53 are (fluid-sealed) adhered to one another by adhesives in a state where both upper and lower surfaces are mutually aligned and the amount of projection of each of the side boards 52, 53 from the square tube member 51 in the horizontal direction is the same on both sides.

As shown in FIG. 5B, at upper positions on the flat plane 52a (inner wall surface contacting the square tube member 51) of the first side board 52, a pair of first electrodes 54, 55 with symmetrical shapes are formed. Each of first electrodes 54, 55 is shaped like a rectangle. The respective first electrodes 54, 55 are separated from each other by a straight gap 521 with a constant width, and are therefore positioned symmetrically about the line bisecting the flat plane 52a parallel to the shorter side thereof. Furthermore, a part of the outer fringe of each of the first electrodes 54, 55 is overlapped onto the outer fringe of the flat plane 52a. Consequently, a part of each of the first electrodes 54, 55 is exposed to the outside of the square tube member 51.

Furthermore, at a lower position on the flat plane 52a of the first side board 52, the second electrode (common electrode) 56 is formed. The second electrode 56 is shaped like a rectangle, and is separated from each of the first electrodes 54, 55, by a straight gap 52c with a constant width perpendicular to the above mentioned gap 52b. Furthermore, the outer fringe of the second electrode 56 reaches the outer fringe of the flat plane 52a. Consequently, a part of the second electrode 56 is exposed to the outside of the square tube member 51b. In the closed container 50 thus constructed, an appropriate amount of electrolytic solution L is injected and sealed.

For detecting the inclinational angle of the object of detection, the completed closed container 50 is fixed to the object of detection such that the central (tilting) axis thereof trends in the direction (direction Y in FIG. 5A) perpendicular to the detection direction (in which the inclinational angle of the object of detection is to be detected). At this time, the concave surface 511a of the square tube member 51 is made to face downward, and the longer sides of the first side board 52 and the second side board 53, i.e., the horizontal reference direction, is made to trend in the detection direction (direction X in FIG. 5A) of the object of detection.

Consequently, the above mentioned concave surface 511a has a curvature in the detection direction of the object of detection, and the substantially flat surface S contacting the concave surface 511a of the square tube member 51, the flat plane 52a of the first side board 52, and the flat plane 53a of the second side board 53, is formed. Then, if the closed container 50 is inclined in the detection direction, the electrolytic solution L moves while keeping the substantially flat surface S, and the air in the closed container 50 moves along the concave surface 511a. Except for the above mentioned points, the closed container 50 in the fourth embodiment has approximately the same arrangement as the closed container 10 in the first embodiment, and the function thereof is also approximately the same.

The advantageous effect of the fourth embodiment is approximately similar to the advantageous effect of the first embodiment, and since the square tube member 51 is assembled of 4 pieces of glass boards 511, 512, 513, 514, it can more easily be made, compared with the cylinder member having a circular cross section or an oval cross section.

Furthermore, similarly to the first embodiment and the second embodiment, it is also possible that at least one group of the respective first electrodes 54, 55 and the second electrode 56 are formed on the inner surface of the square tube member 51 instead of being formed on the flat plane 52*a*.

By the clinometric sensor according to the present invention, while the requirement of high attachment accuracy in the direction perpendicular to the detection direction can be relieved, the influence of the fluctuation of the volume of air depending on the change of the temperature is also reduced.

We claim:

1. A clinometric sensor for detecting a tilt about a tilting axis, said clinometric sensor having a horizontal reference direction and a vertical reference direction perpendicular to the tilting axis and to one another, an inclinational angle of the clinometric sensor corresponding to a deviation of said horizontal reference direction from a terrestrial horizon direction, said clinometric sensor comprising:
    a closed container, including
        a tube-like member arranged along a flat plane perpendicular to the tilting axis as a closed substantially tubular shape, the shape having end openings open toward either side of the flat plane, and
        a pair of side members, each side member having a flat surface arranged parallel to the flat plane, and one side member being arranged at each one of said end openings for closing each one of said end openings of the closed substantially tubular shape; and
    an electrolytic solution injected in said closed container and forming a substantially flat surface in said closed container when the tilting axis of said tube-like member extends in a direction of the terrestrial horizon,
    wherein a cross section of said tube-like member perpendicular to the tilting axis of said tube-like member is an oval shape having a major axis and a minor axis, and wherein the major axis of the oval shape extends in the horizontal reference direction of the clinometric sensor.

2. The clinometric sensor described in claim 1, wherein thickness of the sensor in a direction of the tilting axis is shorter than the diameter thereof.

3. A clinometric sensor for detecting a tilt about a tilting axis, said clinometric sensor having a horizontal reference direction and a vertical reference direction perpendicular to the tilting axis and to one another, an inclinational angle of the clinometric sensor corresponding to a deviation of said horizontal reference direction from a terrestrial horizon direction, said clinometric sensor comprising:
    a closed container, including:
        a plurality of flat members arranged along a flat plane as a closed substantially rectangular shape, the shape having end openings open toward either side of the flat plane, and
        a pair of side members, each side member having a flat surface arranged parallel to the flat plane, and one side member being arranged at each one of said end openings for closing each one of said end openings of the closed substantially rectangular shape; and
    an electrolytic solution injected in said closed container and forming a substantially flat surface in said closed container when the tilting axis of the clinometric sensor extends in a direction of the terrestrial horizon, wherein an internal surface of one of said flat members is formed as a concave surface having a curvature about the tilting axis, a center of said curvature being arranged such that a tangent to the center of said curvature is parallel to the horizontal reference direction of the clinometric sensor.

4. The clinometric sensor described in claim 3, wherein thickness of the sensor in a direction of the tilting axis is shorter than the diameter thereof.

5. A clinometric sensor for detecting a tilt about a tilting axis, said clinometric sensor having a horizontal reference direction and a vertical reference direction perpendicular to the tilting axis and to one another, an inclinational angle of the clinometric sensor corresponding to a deviation of said horizontal reference direction from a terrestrial horizon direction, said clinometric sensor comprising:
    a closed container, including
        a tube-like member arranged along a flat plane as a closed substantially tubular shape, the shape having end openings open toward either side of the flat plane and
        a pair of side members, each side member having a flat surface arranged parallel to the flat plane, and one side member being arranged at each one of said end openings for closing each one of said end openings of the closed
        substantially tubular shape;
    a pair of first electrodes formed internally on the flat surface of one of said side members, a conductive portion internal to said closed container of at least one of said first electrodes contacting said electrolytic solution; and
    a second electrode formed internally on the flat surface of one of said side members, a conductive portion internal to said container of said second electrode contacting said electrolytic solution at all times and in all inclination angles of the clinometric sensor.

6. The clinometric sensor described in claim 5, wherein thickness of the sensor in a direction of the tilting axis is shorter than the diameter thereof.

7. The clinometric sensor described in claim 5, conductive portions internal to said closed container of said pair of first electrodes being both formed on said flat surface of one of said side members, and said conductive portion internal to said closed container of said second electrode contacting said electrolytic solution at all times and in all inclination angles of the clinometric sensor is formed on said flat surface of the remaining one of said side members.

8. The clinometric sensor described in claim 7, wherein conductive portions internal to said closed container of said pair of first electrodes are symmetrically formed on either side of a non-conductive gap having a constant width and extending along the horizontal reference direction of the clinometric sensor.

9. The clinometric sensor described in claim 5, wherein conductive portions internal to said closed container of said pair of first electrodes are symmetrically formed on either side of a first non-conductive gap on said flat surface of said one of said side members, said first non-conductive gap having a constant width and extending in the vertical reference direction, and wherein said conductive portion internal to said closed container of said second electrode is separated from said first electrode by a second non-conductive gap on said flat plane of said one of said side members, said second non-conductive gap having a constant width and extending in the horizontal reference direction of the clinometric sensor.

10. A clinometric sensor for detecting a tilt about a tilting axis, said clinometric sensor having a horizontal reference direction and a vertical reference direction perpendicular to the tilting axis and to one another, an inclinational angle of the clinometric sensor corresponding to a deviation of said horizontal reference direction from a terrestrial horizon direction, said clinometric sensor comprising:

a closed container, including a tube-like member arranged along a flat plane as a closed substantially tubular shape, the shape having end openings open toward either side of the flat plane and a pair of side members, each side member having a flat surface arranged parallel to the flat plane, and one side member being arranged at each one of said end openings for closing each one of said end openings of the closed substantially tubular shape;

a pair of first electrodes formed on the inner circumference of said tube-like member, a conductive portion internal to said closed container of at least one of said first electrodes contacting said electrolytic solution; and a second electrode formed on the inner circumference of said tube-like member, a conductive portion internal to said closed container of said second electrode contacting said electrolytic solution at all times and in all inclination angles of the clinometric sensor.

11. The clinometric sensor described in claim 10, wherein thickness of the sensor in a direction of the tilting axis is shorter than the diameter thereof.

* * * * *